United States Patent [19]
Tomlinson

[11] 3,724,429
[45] Apr. 3, 1973

[54] POLLUTION-REDUCING FUEL FILTER

[76] Inventor: Norfleet Tomlinson, 6433 West 82nd Street, Los Angeles, Calif. 90045

[22] Filed: Nov. 16, 1970

[21] Appl. No.: 90,201

[52] U.S. Cl..............123/25 R, 123/25 E, 123/25 G, 196/46.1, 210/21, 210/511, 261/2, 261/18 A
[51] Int. Cl..........................F02d 19/00, F02d 47/00
[58] Field of Search .......196/46, 46.1; 137/206, 172, 137/587; 210/21, 511; 123/25 G, 25 H, 25 D, 25 E, 25 R; 215/1 C; 220/85 VR, 18 VS, 86 R; 261/2-8, 36 A, 18 A; 23/271, 26 B, 26 D, 270.5, 272.7, 272.8

[56] References Cited
UNITED STATES PATENTS

| | | | |
|---|---|---|---|
| 3,450,116 | 6/1969 | Knight et al. | 123/25 |
| 1,373,720 | 4/1921 | Gish | 210/511 X |
| 1,812,231 | 6/1931 | Agnew | 123/25 |
| 1,960,982 | 5/1934 | Stover | 123/25 |
| 2,570,369 | 10/1951 | Murray | 137/544 X |
| 2,980,275 | 4/1961 | Lundgren | 215/43 R |
| 2,920,777 | 1/1960 | Cole | 215/1 C |
| 1,573,485 | 2/1926 | Fritts | 137/544 |
| 3,259,266 | 7/1966 | Adler | 215/43 R |

Primary Examiner—Norman Yudkoff
Assistant Examiner—David Edwards
Attorney—Fulwider, Patton, Rieber, Lee & Utecht

[57] ABSTRACT

A one-piece plastic bottle having an inlet adjacent its lower end receiving gasoline from a fuel pump, an outlet below its upper end passing gasoline to a carburetor, a layer of water mixed with soluble oil below the outlet, and a sealed compartment for captive air above the outlet so that gasoline bubbles through the mixture, forms a layer thereon, and is cushioned from above by captive air under pressure. A refill opening on the upper end of the bottle is closed by a cap frictionally anchored in place by an O-ring seal.

4 Claims, 4 Drawing Figures

PATENTED APR 3 1973 3,724,429

INVENTOR.
NORFLEET TOMLINSON
BY Fulwider, Patton, Rieber
Lee, and Utecht
ATTORNEYS

POLLUTION-REDUCING FUEL FILTER

BACKGROUND OF THE INVENTION

The present invention relates to the filtering of fuel as it passes through the fuel supply system of an internal combustion engine such as an automobile engine, and relates more particularly to a pollution-reducing filter of the type in which the fuel, typically gasoline, is passed through water or a water mixture prior to being fed into the carburetor of the automobile.

In general, it has been known that such treatment of fuel prior to feeding of the fuel to the engine has beneficial results, both in washing suspended foreign substances from the fuel and in adding small quantities of water to the fuel to increase the quality of performance of the engine. One prior approach is shown in U.S. Pat. No. 1,373,720 which discloses a float-controlled valve arrangement whereby gasoline is passed through water in a tank, filling the upper end of the tank from which it flows to a carburetor.

Other related approaches have been suggested, but have not been found to be commercially practical, despite the recognized advantages of the treatment, including smoother engine performance, improved gasoline mileage, lengthened spark plug life, improved cleanliness of carburetors and engine parts, and, most importantly, reduced emission of smog-producing pollutants.

SUMMARY OF THE INVENTION

The present invention resides in the filtering of gasoline or other fuel through a body of water prior to introduction of the fuel into the engine, in a novel manner which renders the treatment completely safe and practical, and also highly effective to add small quantities of a mixture of water and soluble oil to the gasoline for passage with the gasoline through the carburetor and into the engine. Moreover, the invention avoids interference with the normal fuel flow to the carburetor and smoothes out pulses in the flow which otherwise might exist.

More specifically, the invention utilizes a container having vertically spaced fuel inlet and outlet openings and adapted to be filled with water to a level between these openings, the lower, inlet opening being connectible to a line leading to the fuel pump of an automobile, and the upper, outlet opening being connectible to a line leading to the carburetor. Above the outlet opening is a closed air compartment for holding a captive body of compressed air forming a cushion which resists movement of the fuel above the normal fuel level adjacent the outlet opening.

Since the mixture of water and soluble oil is gradually consumed in use, a refill opening is provided in the air compartment but is covered by a closure cap which is both threaded and frictionally sealed on the container by a seal ring which resists vibrational loosening of the cap in use. Preferably, the container is a one-piece plastic bottle having the air compartment as a reduced-size extension of the body, and the closure is a cap threaded onto a neck on the upper end of the extension, with the seal ring confined between the neck and a depending skirt on the cap. The neck is offset to one side of the extension to form a head on the bottle for more securing mounting, and the soluble oil in the water provides a line of color demarcation indicating the water level, and also minimizes rust in the system.

Other objects and advantages of the invention will become apparent from the following detailed description, taken in conjunction with the accompanying drawing.

DETAILED DESCRIPTION

Figure 1:
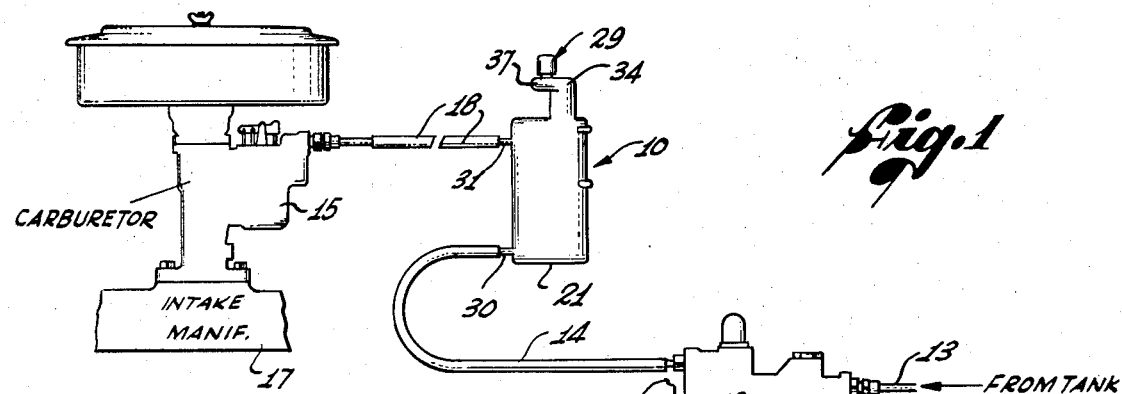
FIG. 1 is a side elevational view schematically showing the basic components of the fuel supply system of an internal combustion engine equipped with a fuel filter embodying the novel features of the present invention.

As shown in the drawings for purposes of illustration, the invention is embodied in a pollution-reducing fuel filter 10 incorporated into the fuel supply system of an internal combustion engine, partly shown at 11 in FIG. 1, the system including a conventional fuel pump 12 having an intake line 13 leading to the gasoline tank of an automobile (not shown), and an output line 14 through which the gasoline is pumped toward a carburetor 15 mounted on the intake manifold 17 of the engine. Since the present invention is not limited in utility to any particular type of engine or arrangement of parts of the fuel combustion system, it is to be understood that these parts are shown herein for background purposes only.

The fuel filter 10 is interposed in the fuel supply system between the fuel pump 12 and the carburetor 15 so as to receive gasoline from the fuel pump through the output line 14. After passing through the filter, the gasoline flows to the carburetor through a continuation 18 of the output line leading to the intake of the carburetor. Of course, the gasoline then is mixed with air and introduced into the intake manifold 17 for combustion in the conventional manner.

In passing through the fuel filter 10, the gasoline is bubbled through a liquid layer 19 composed primarily of water, and in doing so, is washed to remove suspended impurities, which remain in the water, and also picks up a relatively small amount of the water, which is carried with the gasoline through the carburetor 15 and into the intake manifold 17. As has been mentioned, this treatment has the recognized advantages of increasing gasoline mileage and continuously cleaning the associated parts for generally improved performance and reduced maintenance requirements. The primary advantage of the treatment, however, is a marked reduction in smog-producing pollutants in the exhaust emission from the engine. This has been attributed to the reduction of the fuel combustion temperature by the water carried by the gasoline, and to the continuous cleaning of the engine, and the spark plugs and points thereof, by the steam which is formed by the water. It has been found that such cleaning results in a sharp reduction of carbon in the exhaust after a relatively short period of such treatment.

Figure 2:
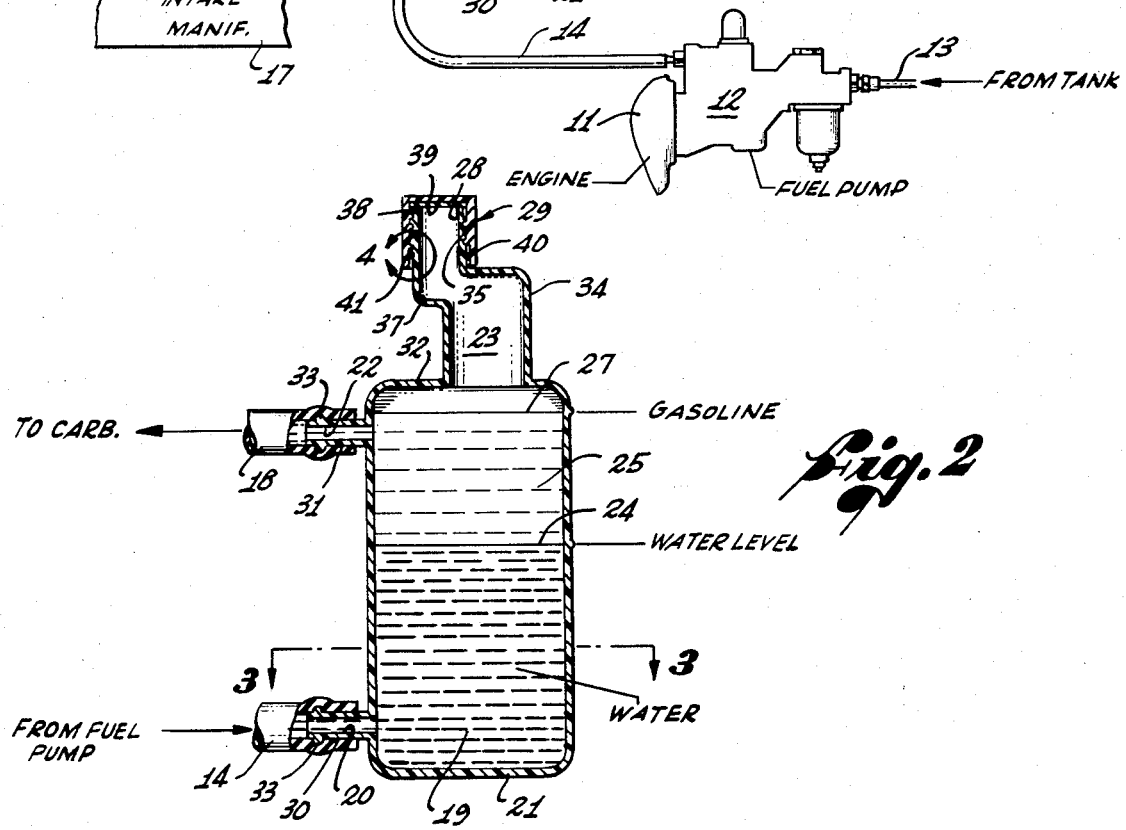
FIG. 2 is an enlarged cross-sectional view taken in a central vertical plan through the fuel filter of FIG. 1, with connecting lines shown fragmentarily and partly broken away.

As shown most clearly in FIG. 2, the fuel filter 10 of the present invention comprises a vertically elongated container having an inlet 20 adjacent its lower end 21, an outlet 22 spaced well above the inlet, and a closed air compartment 23 constituting the upper end portion of the container and projecting well above the level of the outlet. The lower portion of the container is filled with a mixture of water and soluble oil to a level 24 above the inlet 20 but below the outlet 22, and a layer 25 of gasoline is shown above the water layer 19 to a level 27 above the outlet. A refill opening 28 is formed in the upper portion of the container for replenishment of the water mixture in the container, but normally is securely closed and sealed by a closure 29.

With this general arrangement, the container first is filled with the water mixture approximately to the level 24, which may be indicated by a line on the container visible from the exterior thereof, and then is sealed by the closure 29 preparatory to operation of the automobile. Then, as the automobile is started, the fuel pump 12 forces gasoline through the line 14 and the inlet 20 into the container below the water level 24, to bubble up through the water toward the outlet 22. The gasoline, being lighter than water, forms the layer 25 on top of the water and rapidly builds up to the level 27 above the outlet 22.

As this occurs, the gasoline layer displaces air from the container until it rises above the outlet 22, and then begins to flow out through the outlet. The captive air trapped in the compartment 23 above the gasoline is placed under pressure, determined primarily by the fuel pump 12, and forms a resilient cushion resisting movement of the gasoline into the compartment but yielding to absorb pulses of gasoline into the container, thus smoothing out the flow of gasoline through the container. Accordingly, the filter 10 serves its primary purpose of adding water to the gasoline passing through the water and washing the gasoline, and also cushions the pulses of gasoline while minimizing splashing of gasoline or water against the closure 29.

The preferred embodiment of the filter 10 uses a one-piece plastic bottle of the shape shown, in which the inlet 20 is a passage through an integral, laterally projecting tube 30 adjacent the bottom 21 of the bottle, and the outlet 22 is a passage through a similar integral tube 31 adjacent the upper end 32 of the body of the bottle. Each tube preferably has an external encircling rib 33 (FIG. 2) adjacent its free end for anchoring the tube in the line 14, 18 into which it is telescoped.

The air compartment 23 is defined by an integral, hollow, and generally cylindrical extension 34, of reduced cross-sectional area, projecting upwardly from the upper end 32 of the body of the bottle, and the refill opening 28 is at the open upper end of a tubular extension forming a neck 35 at the upper end of the extension 34. This neck is offset laterally from the center line of the air compartment, reducing the direct flow area from the main body to the refill opening and forming a hollow integral head 37 below which the bottle may be securely held by a clamp (not shown). Adjacent its upper end, the neck is externally threaded at 38 to receive the closure 29.

Figure 4:
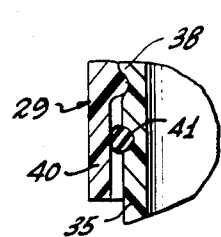
FIG. 4 is an enlarged fragmentary cross-section of the parts substantially within the arc 4—4 of FIG. 2.
Figure 3:
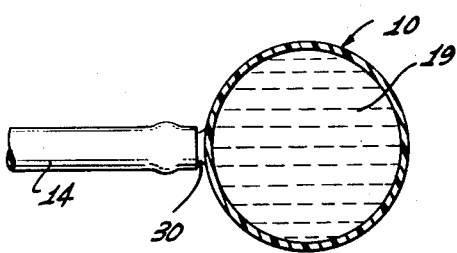
FIG. 3 is a cross-sectional view taken along the line 3—3 of FIG. 2.

As shown most clearly in FIGS. 2 and 4, the closure 29 is a cup-shaped cap having an internal thread mating with the threads on the neck, and has a sealing disk 39 against its top wall pressed tightly against the upper end of the neck 35 to provide a tight seal between the cap and the neck. In addition, the depending sidewall of the cap extends downwardly beyond the threaded portion of the neck to form a skirt 40 which overlies a resilient O-ring seal 41 encircling the neck below the threaded portion. This seal serves the dual purpose of backing up the sealing disk 39 to insure against leakage through the threads, and of providing a friction anchor resisting untwisting of the cap as a result of vibration of the bottle in use. Thus, the cap is tightly sealed and securely held to prevent accidental leakage or loosening.

A very small amount of soluble oil should be mixed with the water to provide a visible line of color demarcation between the gasoline and the water and to continuously lubricate the parts which are exposed to the water. While various oils may be used, an example of a suitable oil is that sold under the trademark "Bars Leak" for use as a radiator lubricant. In practice, about one thimbleful of such oil has been mixed to one pint of water. A suitable amount of antifreeze also may be added in cold-weather areas.

It should be noted that one charge of about one-half pint of the water mixture in a 1-pint bottle has been found sufficient to last through at least three or four tanks of gasoline. As the water is consumed, the water level 24 gradually recedes and the gasoline layer 25 increases downwardly in thickness. Even when all the water has been consumed, however, the filter 10 remains effective to pass gasoline between the fuel pump 12 and the carburetor 15, so no hazard results from inadvertent failure to replenish the water.

From the foregoing, it should be apparent that the present invention provides a safe and effective fuel filter 10 for accomplishing the intended purposes, and does this in a relatively simple and inexpensive manner permitting the filter to be installed simply and easily on existing automobiles. It also will be apparent that, while a particular form of the invention has been illustrated and described, various modifications can be made without departing from the spirit and scope of the invention.

I claim:

1. A pollution-reducing fuel filter for incorporation in the fuel supply system of an internal combustion engine, said filter comprising:
    a one-piece plastic bottle filled to a preselected level with water and having an inlet below said level and adjacent its lower end for connection to the fuel supply of the engine, and an outlet spaced above said preselected level far enough to form a layer of fuel between said preselected level and said outlet;
    said bottle having a hollow, generally cylindrical extension projecting upwardly above said outlet for holding a body of captive air under pressure above said layer of fuel, and a reduced diameter upper end portion forming a hollow head on said extension for clamping of said bottle in place below said head;
    a neck extending upwardly from said head in laterally offset relation with said extension and threaded to receive a threaded closure;

and a cap constituting a closure threaded on said neck and tightly sealed against the latter to hold the captive air in said extension as fuel bubbles through the water and forms the layer thereon from which the fuel and water passes out through said outlet.

2. A fuel filter as defined in claim 1 further including a first seal pressed between the cap and the end of said neck, and a second seal in the form of an O-ring encircling said neck, said cap having a skirt telescoped over said neck and pressed tightly against said second seal both to form a back-up for said first seal and to frictionally anchor said cap on said neck.

3. A fuel filter as defined in claim 1 in which said water is mixed with soluble oil.

4. A pollution-reducing filter for incorporation on the fuel supply system of an internal combustion engine, said filter comprising:

a plastic bottle having an inlet in the lower portion but above the bottom thereof, for connection to the fuel supply of the engine, and an outlet spaced above said inlet and opening laterally through a sidewall of the bottle for connection to the fuel intake of the engine, and being filled with water to a level between said inlet and said outlet so as to bubble fuel from said inlet upwardly through the water and form a layer of fuel in said bottle from said level to above said outlet;

said bottle also having an integral extension of reduced cross-sectional area defining a closed air compartment above said outlet for holding a body of captive air under pressure above said fuel layer and forming a cushion for maintaining a substantially even flow of fuel to and through said bottle, said extension having a laterally offset tubular projection on the upper end of said extension;

said bottle having an opening in the upper end of said projection for the replenishment of water therein after the water level has fallen in use as a result of entrainment of water in the fuel passing through the bottle;

and a cap tightly but removably threaded onto said projection and sealing said opening.

* * * * *